United States Patent [19]
Ito et al.

[11] Patent Number: 5,151,796
[45] Date of Patent: Sep. 29, 1992

[54] IMAGE READING APPARATUS HAVING A D/A CONVERTER WITH A CONTROLLABLE OUTPUT

[75] Inventors: Yasuo Ito, Inagi; Hiroshi Kyogoku, Nishimine, both of Japan

[73] Assignee: Canon Kabushiki Kaisha, Tokyo, Japan

[21] Appl. No.: 500,394

[22] Filed: Mar. 28, 1990

[30] Foreign Application Priority Data

Mar. 29, 1989 [JP] Japan .................................. 1-74901
Jun. 1, 1989 [JP] Japan .................................. 1-137423
Jun. 1, 1989 [JP] Japan .................................. 1-137424

[51] Int. Cl.$^5$ .............................................. H04N 1/40
[52] U.S. Cl. ................................ 358/461; 358/463; 358/475
[58] Field of Search ......................... 358/461, 463, 475

[56] References Cited

U.S. PATENT DOCUMENTS 4,408,231 10/1983 Bushaw et al. ..................... 358/475

*Primary Examiner*—Edward L. Coles, Sr.
*Attorney, Agent, or Firm*—Fitzpatrick, Cella, Harper & Scinto

[57] ABSTRACT

Image reading apparatus having a D/A converter with a controllable output includes a light source for illuminating an original image. A reading device is provided for photoelectrically reading the original image illuminated by the light source and generating an analog image signal. A D/A converter is provided having a digital input terminal, an analog output terminal, and a reference terminal. The analog image signal generated from the reading device is applied to the reference terminal. The D/A converter attenuates the level of the analog image signal applied to the reference terminal based on a damping factor corresponding to the digital data applied to the digital input terminal. The thus-attenuated analog image signal is then output to the analog output terminal. An amplifier is provided for amplifying the attenuated analog image signal output from the analog output terminal of the D/A converter. An A/D converter is provided for converting the amplified analog image signal output from the amplifier into a digital image signal. Control circuitry is provided for controlling the digital data applied to the digital input terminal of the D/A converter to cause the analog image signal supplied to the A/D converter to have a predetermined level. This provides an analog image signal having a constant signal level even when the brightness of the light source, (e.g., a fluorescent lamp) varies widely.

18 Claims, 10 Drawing Sheets

5,151,796

IMAGE READING APPARATUS HAVING A D/A CONVERTER WITH A CONTROLLABLE OUTPUT

BACKGROUND OF THE INVENTION

1. Field of the Invention

The present invention relates to an image reading apparatus for reading an original image by photoelectric conversion and thereby obtaining an electrical image signal.

2. Related Background Art

An image reading apparatus, or image scanner, for reading image information (for example of documents or books in the form of an electrical information signal), is generally provided with, as shown in FIG. 1, a light source 4 for illuminating an original document 3 placed on a support glass plate 2 of a casing 1; three movable mirrors 8, 9, 10 for guiding the reflected light 5 from said original 3 to a line sensor 7 through an imaging lens 6; a circuit board 12 for processing the electrical signal obtained by photoelectric conversion in said line sensor 7 and for controlling the function of the entre apparatus; and an interface (I/F) unit 13 for sending the image signal to external equipment. The light source 4 and the mirror 8 move integrally with a speed equal to twice of that of the mirrors 9, 10.

The light source 4 for illuminating the original 3 is often composed of a fluorescent lamp because of the sufficient light intensity and the low cost. However the fluorescent lamp is also associated with certain drawbacks, such as the necessity for a preheating time for preventing the deterioration of electrodes, and the necessity for high frequency lighting in order to avoid unevenness in the illumination. The most serious drawback, however, of the fluorescent lamp is the significant dependence of light intensity on the ambient temperature as shown in FIG. 2, and the variation in light intensity according to the lighting time. Various measures have been employed for avoiding these drawbacks.

One of such conventional measures is to attach a planar heater to the fluorescent lamp, for heating the tube wall of said lamp at the start of lighting and when in a low temperature state. However, such a method is still unsatisfactory in the overall performance, requiring considerable electric power for the heater and involving a time lag before a sufficient effect is obtained.

Another measure lies in the control of the current in the fluorescent lamp, according to the amount of light detected from the lamp. However, this method requires a photosensor for said detection, and involves a considerable cost increase for example in the power source, despite the fact that the light intensity does not increase in proportion to the electric power supplied to the fluorescent lamp.

Still another measure, with relatively limited cost increase, employs a circuit as shown in FIG. 3. In such conventional method, around an original reading area 2A on the glass plate 2, there are provided, as shown in FIG. 4, a first reference white plate 15 positioned along the main scanning direction MD of the line sensor 7 to be read by said line sensor 7 immediately before the reading of the original image, and second reference white plate 16 positioned along the sub scanning direction SD to be read by the line sensor 7 during the reading of the original image. Prior to the original image reading, the line sensor 7 provides signals as shown in FIG. 5 corresponding to the reference white plates 15, 16, wherein an area A1 indicates the signal obtained by reading the plate 15, while an area A2 indicates the signal obtained by reading the plate 16.

It is assumed, in FIG. 5, that the reference signal level of the area A2 is a half of the maximum signal level of the area A1.

Referring to FIG. 3, a signal of the area A2 is sampled by an analog switch 17 and is doubled by an amplifier 18 to obtain a voltage V1, which is subjected to sample holding by a sample-and-hold (S/H) circuit 19. Thus processed signal is supplied to a reference terminal of an A/D converter 20 through AS2 of analog switches 23. Also, an input video signal obtained by reading the reference white plate 15 is supplied, through an amplifier 40, to the A/D converter 20, then digitized utilizing the signal from the S/H circuit 19, and stored temporarily as a reference signal in a memory 21.

Thereafter said reference signal is released from said memory 21, and is supplied to a D/A converter 22 to obtain an analog signal which is supplied to the reference terminal of the A/D converter 20 through AS3 of the analog switches 23. Then, the input video signal obtained by reading the original image is digitized in the A/D converter 20, using the signal read from the memory 21 as reference. At the same time the reference signal varying in the sub scanning direction is supplied to the reference terminal of the D/A converter 22 through an analog switch 17, an amplifier 18 and a S/H circuit 19, thereby compensating the fluctuation in time.

However, in such circuit structure as shown in FIG. 3, if a fluorescent lamp is used as the light source, the level of the input video signal varies about ten times or more at maximum. Consequently, when the light intensity of the light source is low, the reference voltage of the A/D converter 20 also becomes low, so that the precise digitization of the input video signal cannot be expected in comparison with the case in the presence of a reference voltage of a sufficient level. Also, since the shading correction is based on the same reference voltage, the precision of the shading correction is lowered when the light intensity of the light source is weak, and this fact also leads to a lowered precision of digitization.

SUMMARY OF THE INVENTION

In consideration of the foregoing, an object of the present invention is to provide an image reading apparatus capable of satisfactory image reading regardless of the intensity of the light source for illuminating the original image.

Another object of the present invention is to provide an image reading apparatus enabling satisfactory conversion of the analog signal, obtained by photoelectrically reading an original image, into a digital signal.

Still another object of the present invention is to provide an image reading apparatus capable of constantly providing the image signal of a predetermined level regardless of the variation in the light intensity of the light source for illuminating the original image.

The foregoing and still other objects of the present invention, and the advantages thereof, will become fully apparent from the following description.

DESCRIPTION OF THE PREFERRED EMBODIMENTS

Now, the present invention will be clarified in detail by embodiments thereof shown in the attached drawings.

Figure 6:
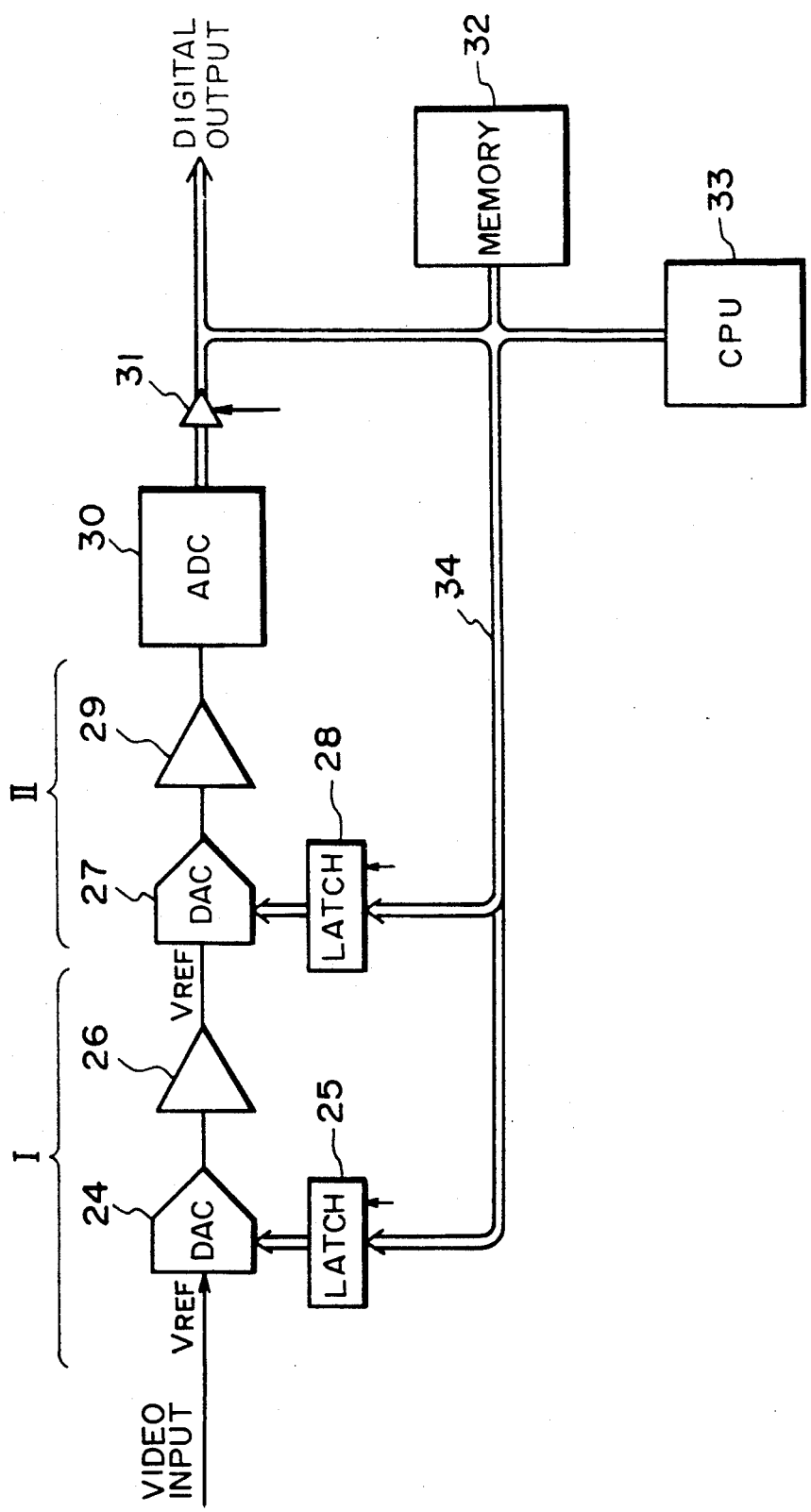
FIG. 6 is a block diagram of an image reading apparatus constituting an embodiment of the present invention.

FIG. 6 illustrates an embodiment of the present invention.

There are shown an 8-bit input D/A converter (hereinafter called DAC) 24 for attenuating the video input signal to 1/12 at maximum, used as a digital attenuator; an amplifier 26 with a gain of 12 times, used for amplifying the signal from the DAC 24; an 8-bit input DAC 27 with a damping factor corresponding to the shading correction; and an amplifier 29 for amplifying the signal from the DAC 27.

Figure 5:
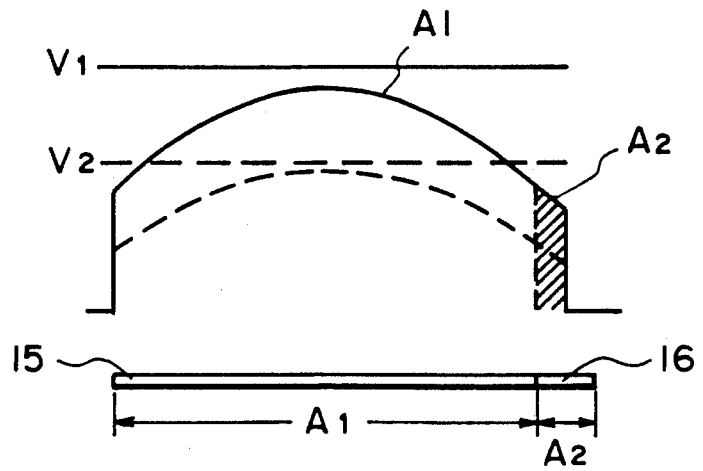
FIG. 5 is a wave form chart showing an example of signals read from white reference boards.

At first, the signal level is attenuated down, at maximum, to 1/12 by the DAC 24, and the attenuated signal is amplified 12 times by the amplifier 26. Then the signal is attenuated by the DAC 27 of which the damping factor is set at maximum at $\frac{1}{2}$ in case the signal level at both sides is $\frac{1}{2}$ of the maximum signal level as shown in FIG. 5, and the attenuated signal is amplified to 2 times by the amplifier 29. Consequently the maximum value of the output of the amplifier 29 can be matched with the maximum input level of an ADC 30.

Figure 7:
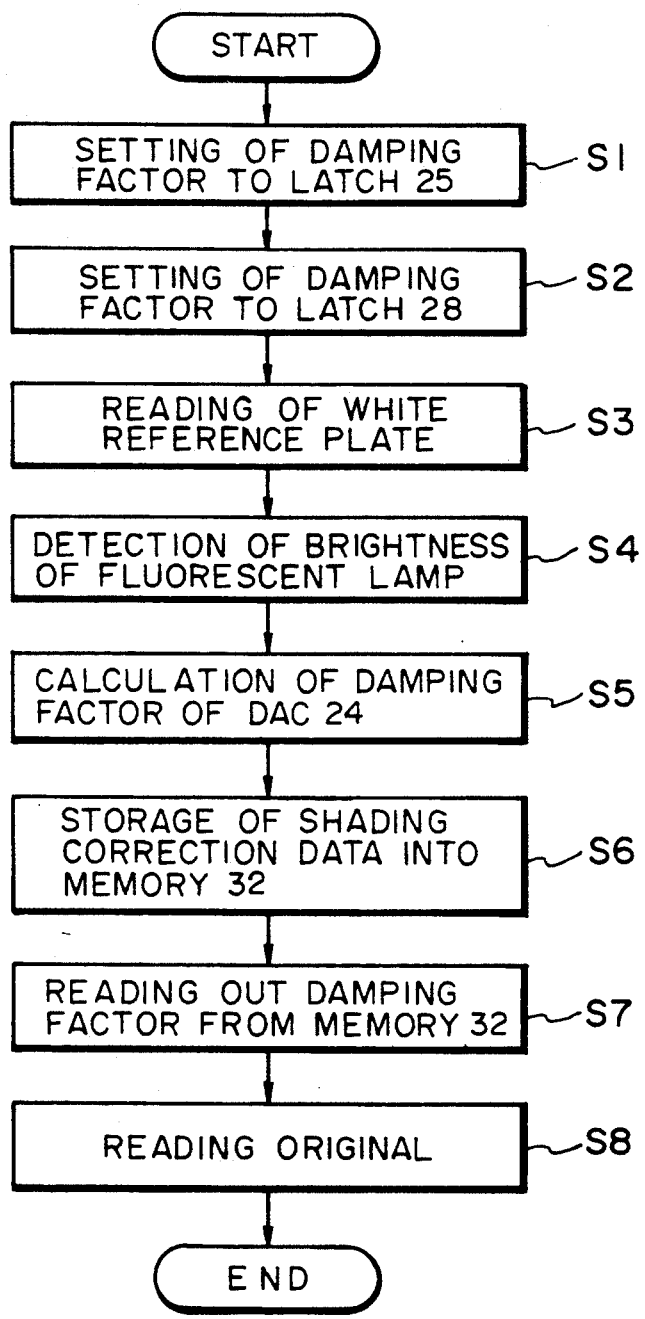
FIG. 7 is a flow chart showing the control sequence in white reference plate reading.

FIG. 7 is a flow chart showing the control sequence in the white reference plate reading.

At first, for attenuating the video input signal to 1/12 by the DAC 24, a step S1 sets a value "21" corresponding to a damping factor 1/12 in a latch 25. Also, for attenuating the signal level to $\frac{1}{2}$ by the DAC 27, a step S2 sets a value "128" corresponding to a damping factor $\frac{1}{2}$ in a lapch 28. Then a step S3 reads the white reference plates 15, 16 shown in FIG. 4, and a step S4 detects the brightness of the fluorescent lamp from the output signal level of a tristate buffer 31. A step S5 calculates the damping factor of the DAC 24 from the brightness of the fluorescent lamp, and sets the thus calculated damping factor in a latch 25.

For example, if said brightness is at a maximum, a value "21" is set corresponding to the maximum damping factor of 1/12, and, if it is at a minimum, a value "255" is set corresponding to a damping factor 0. If the brightness is between the maximum and the minimum, there is set a value corresponding to a damping factor which in turn corresponds to said brightness. Consequently, the maximum output level of the amplifier 26 can always be maintained constant regardless of the brightness of the fluorescent lamp. Then, a step S6 stores the output obtained by reading the white reference plate 15 in a memory 32. Subsequently, a step S7 sets the output obtained from the memory 32 in succession in a latch 28, and a step S8 executes the reading of the original image. Thus the analog signal is brought to the maximum level by a circuit I, and is then subjected to the shading correction in a circuit II.

The above-explained combination of attenuator and amplifier in two steps supplies the ADC 30 with a constant signal level even when the brightness of the fluorescent lamp varies 10 times.

Figure 8:
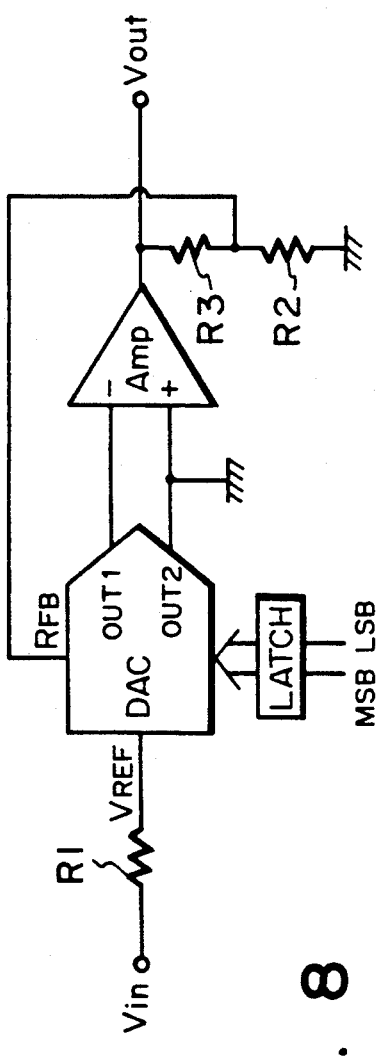
FIG. 8 is a circuit diagram of an example of an actual circuit in which an attenuator and an amplifier are combined.

FIG. 8 shows an example of actual circuit of the combination of an attenuator DAC and an amplifier AMP.

The gain of the amplifier Amp is set at 12 times by resistors R2, R3, and values $N = 21 - 255$ corresponding to different damping factors are set in a latch. By selecting the resistor R1 equal to $R2R3/(R2+R3)$, there is obtained an output $V_{out} = ((R2 \; R3)/R2)(N/256)$.

In the embodiment shown in FIG. 6, the entire circuit is functionally divided, for the convenience of explanation, into the circuits I and II respectively with a damping factor of 1/12 and an amplification factor of 12 times, but such structures gives rise to digitizing errors and distortions, thus deteriorating the precision. It is therefore possible to improve the precision of correction by reducing the damping factor and the amplification factor of the circuit I, for example to $\frac{1}{4}$ and 4 times respectively, thus normalizing the signal to a level equal to $\frac{1}{3}$ of the original level, and increasing the gain of the circuit II from 2 times to 6 times as a product of the damping factor and the amplification factor, thereby distributing the attenuation and amplification among plural circuits in an appropriate manner.

The proportion of such distribution can naturally be suitably determined in consideration of the precision of the DAC and the gain of the amplifier.

It is also possible, in the course of the original image reading, to monitor the signal level in the area A2 in FIG. 5, corresponding to the white reference plate in the sub scanning direction, and, in case of any change in said signal level, to set a value corresponding to said change in the latch 25, thereby responding to the change in the brightness of the fluorescent lamp.

It is also possible to attenuate the output signal level at the reading of the white reference plate to a predetermined level, and to effect the normalization according to the damping factor of said attenuation.

Figure 9:
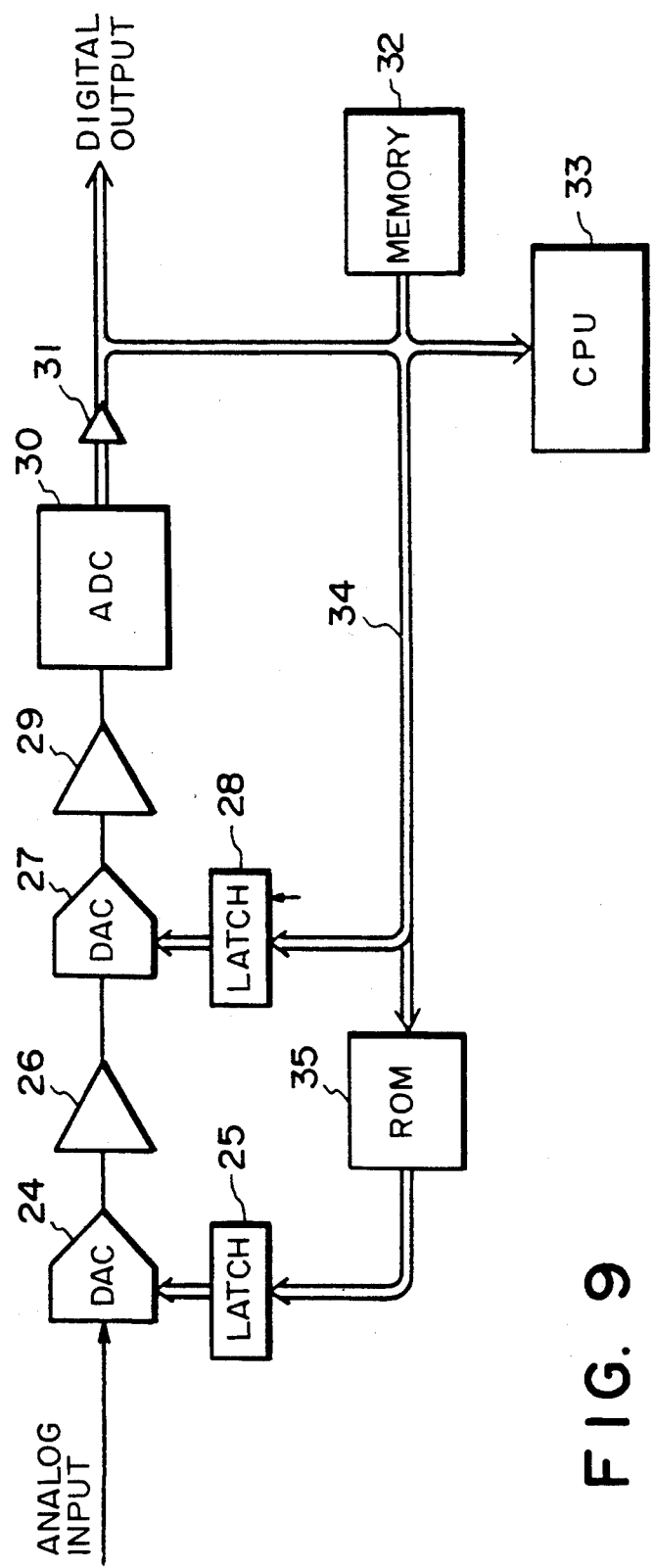
FIGS. 9, 10, 11, 12 and 15 are block diagrams of other embodiments of the image reading apparatus of the present invention.

It is furthermore possible to convert the brightness of the fluorescent lamp into the corresponding damping factor by a table stored in the ROM 35, utilizing a circuit shown in FIG. 9.

The structure explained above can prevent distortion or non-linearity in the digitization and can improve the precision of shading correction.

As explained in the foregoing, the signal level from the reference white plate is corrected, before supply to the A/D converter for conversion from the analog signal to the digital signal, in such a manner that the maximum white level of said signal is always equal to the maximum input level of said A/D converter regardless of the change in the brightness of the light source. Consequently, said A/D converter can always receive the maximum signal level with a full range even in the presence of variations in the brightness of the light source, and can therefore effect digitization with sufficient precision without distortion or non-linearity.

Figure 10:
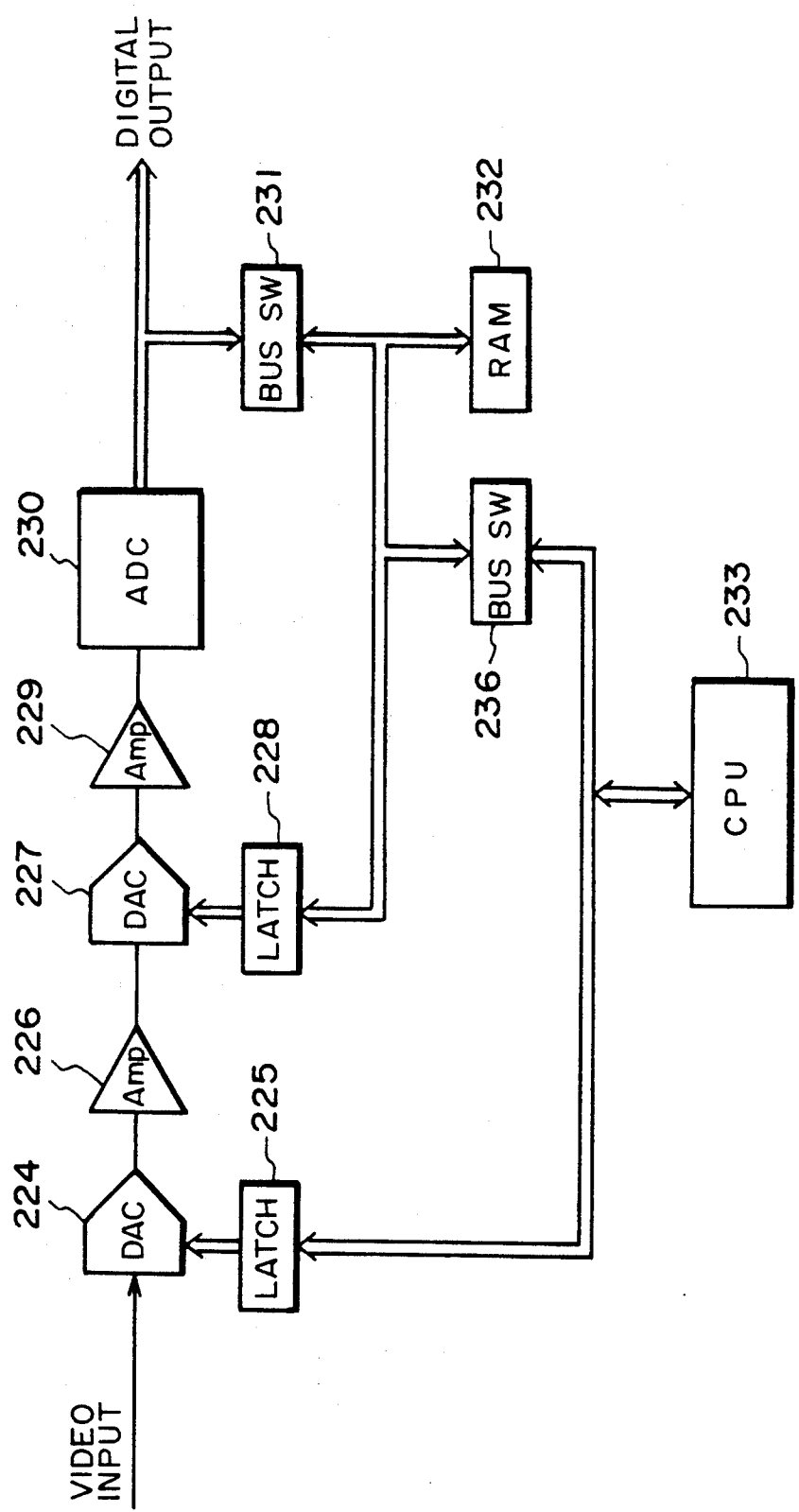

FIG. 10 shows the structure of still another embodiment of the present invention.

Figure 1:
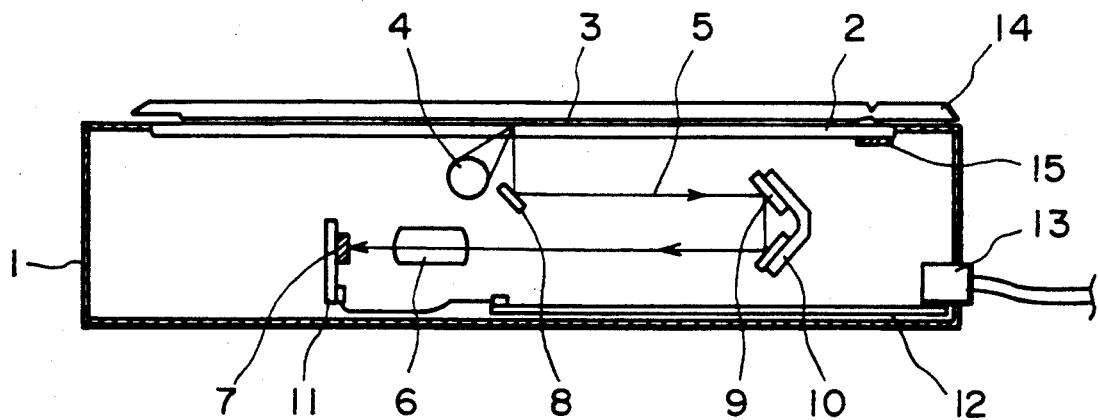
FIG. 1 is a schematic cross-sectional view of an image reading apparatus in which the present invention is applicable.

In FIG. 10 there are shown a multiplication D/A converter (hereinafter called DAC) 224 for amplifying the input video signal from the line sensor 7 (see FIG. 1); and amplifier 226 for converting the current from the DAC 224 into a voltage; and a latch circuit 225 for setting a digital reference input for the DAC 224. Said components 224, 225, 226 constitute a circuit for amplifying the input video signal. Behind the amplifier 226, there are connected a D/A converter 227, a latch circuit 228 and an amplifier similar to 224, 225, 226, constituting a circuit for shading correction. The DAC's 224, 227 are used as resistors, and can therefore be replaced by known variable resistors.

There are also provided an A/D converter (hereinafter called ADC) 230 for converting the analog signal supplied from the amplifier 229 into a digital signal; a random access memory (RAM) 232 for temporarily storing a white reference signal for shading correction, supplied through the ADC 230 and a bus switch 231; bus switches 231, 236 for controlling the signal flow in a data bus for the RAM 232, ADC 230 and CPU233; and a central processing unit (CPU) 233 for controlling the entire apparatus.

In the following there will be explained the function of the circuit described above.

In the circuit shown in FIG. 10, the control data for the DAC 224, 227 are assumed to be of 8 bits. At first the CPU 233 sets "255" in the latch circuit 228 through the bus switch 236 at the reading of the white reference signal, thereby setting the DAC 227 at a gain 256/255. At the same time, the CPU 233 sets "255" in the other latch circuit 225 so as to set the DAC 224 at the minimum gain 256/255.

Then the CPU 233 discriminates whether the digital signal obtained by digitization of the input video signal by the ADC 230, corresponding to the brightness of the fluorescent lamp 4, is at a predetermined level, and, if not, increases the gain of the DAC 224 through the latch circuit 225 until said digital signal reaches said predetermined level.

More specifically, if the white reference signal in the sub scanning direction has a maximum level A (V) and a minimum level A/8 (V), the CPU 233 varies the latch data given to the latch circuit 225 within a range from 1 to 255, so as to obtain a gain 256/255 for the maximum value and a gain 8 for the minimum value.

When the CPU 233 identifies that the output of the ADC 230 is equal to the predetermined level, the value in the latch circuit 225 providing the corresponding gain is stored in the RAM 232.

If said predetermined value is not reached even when the gain of the DAC 224 becomes equal to 8 times, the CPU 233 waits for a predetermined period with the fluorescent lamp 4 (FIG. 1) in the turned-on state, thereby awaiting the increase in the brightness thereof and suspending the signal reading until a gain in excess of 8 times becomes unnecessary. However, if the output of the ADC 230 does not reach the predetermined level even after the lapse of a predetermined period, the CPU 233 judges that the fluorescent lamp 4 has deteriorated and shows a message to that effect on a display unit (not shown) of the operation unit.

After confirming that the white reference signal has reached the predetermined level, the CPU 233 stores the white reference signal for a line, obtained in this state from the ADC 230, as the shading correction data, in the RAM 232 through the bus switch 231.

Then, the CPU 233 reads the value corresponding to the gain determined when said predetermined value is reached, from the RAM 232, sets said value again in the latch circuit 225, and sends the white reference signal for shading correction in succession from the RAM 232 to the latch circuit 228, thereby reading the image data of the original image.

As explained above, the present embodiment supplies the ADC 230 with the video input signal with a substantially constant level even in the presence of variations of the brightness of the light source, through the use of a combination of two DAC circuits.

In the foregoing description, for the convenience of understanding, the function of the circuit has been divided into a first circuit (I) comprising the DAC 224, latch circuit 225 and amplifier 226, and the second circuit (II) comprising the DAC 227, latch circuit 228 and amplifier 229, so that the maximum gain of the first circuit (I) is selected as 8 times. However, an excessively large gain in the circuit (I) may lead to a digitizing error or a distortion, thus deteriorating the precision of signal digitization. It is therefore possible to select the maximum gain of the circuit (I) as 4 times, and to give an additional gain of 2 times in the circuit (II).

For example, if the peak value of the shading wave form shown in FIG. 5 is less than twice the lowest level at both ends, it is possible to allot the lower 7 bits of the DAC 227 for shading correction and to utilize the uppermost bit for gain correction of 2 times. It is also possible, in the course of the original image reading, to monitor the signal level in the area A2 in FIG. 5, corresponding to the white reference plate in the sub scanning direction, by the CPU 233, and, in case of any change in said signal level, to set a value corresponding to said change in the latch circuit 225, thereby properly following the time-dependent change in the brightness of the fluorescent lamp.

The present embodiment employs 8-bit DAC's, but the number of bits of the DAC may be increased according to the required precision of digitization.

Figure 11:
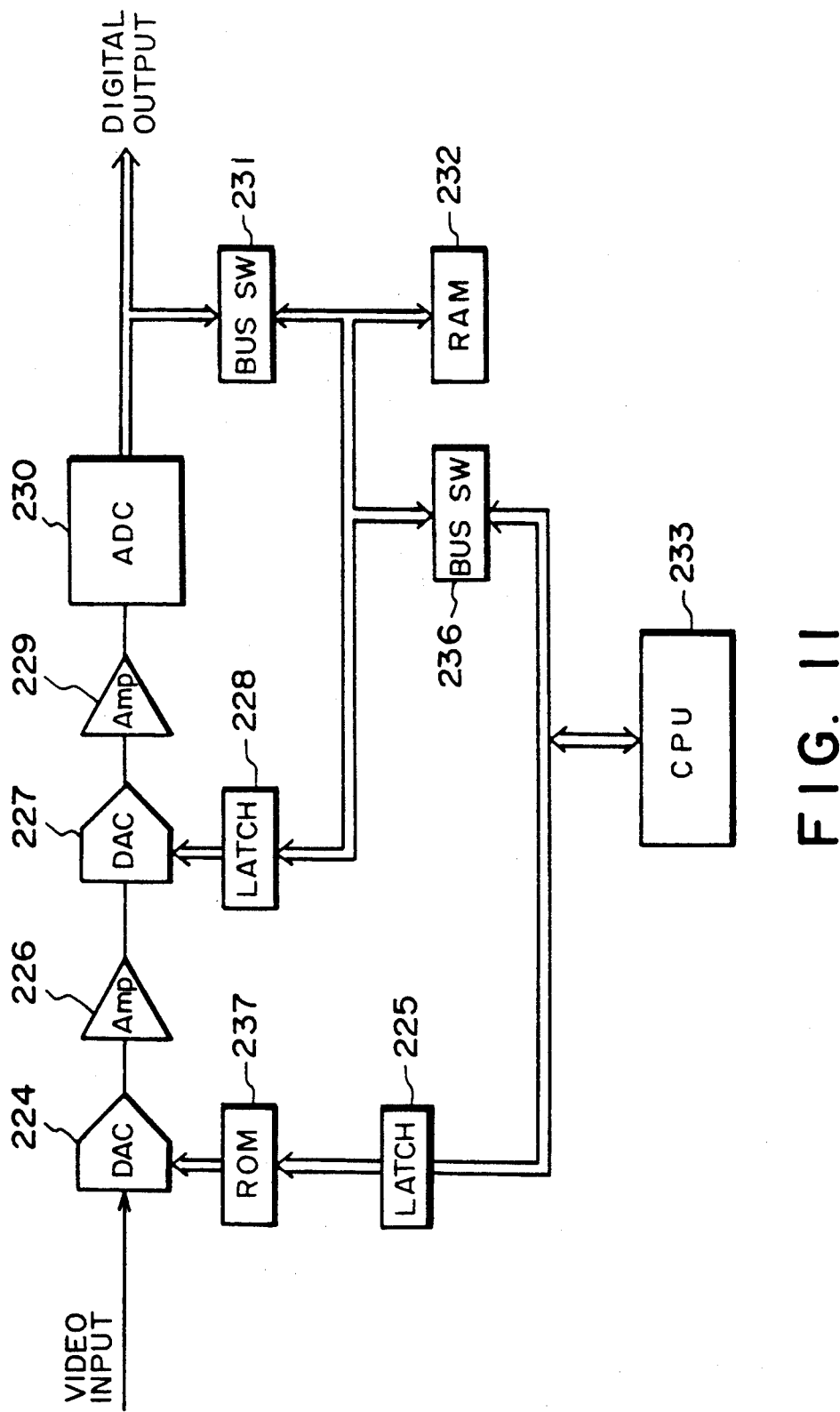

Also, as another embodiment of the present invention, the brightness of the light source and the gain of the DAC 224 may be correlated by a table conversion employing a read-only memory (ROM) 237 as shown in FIG. 11.

The above-explained structure converts the analog image signal into a digital image signal in an almost full-range state, thereby improving the precision of digitization.

Also, being capable of regulating the gain by constantly monitoring the change in brightness of the light source, it can flexibly respond to the change in the brightness of the light source dependent on temperature and time.

Figure 12:
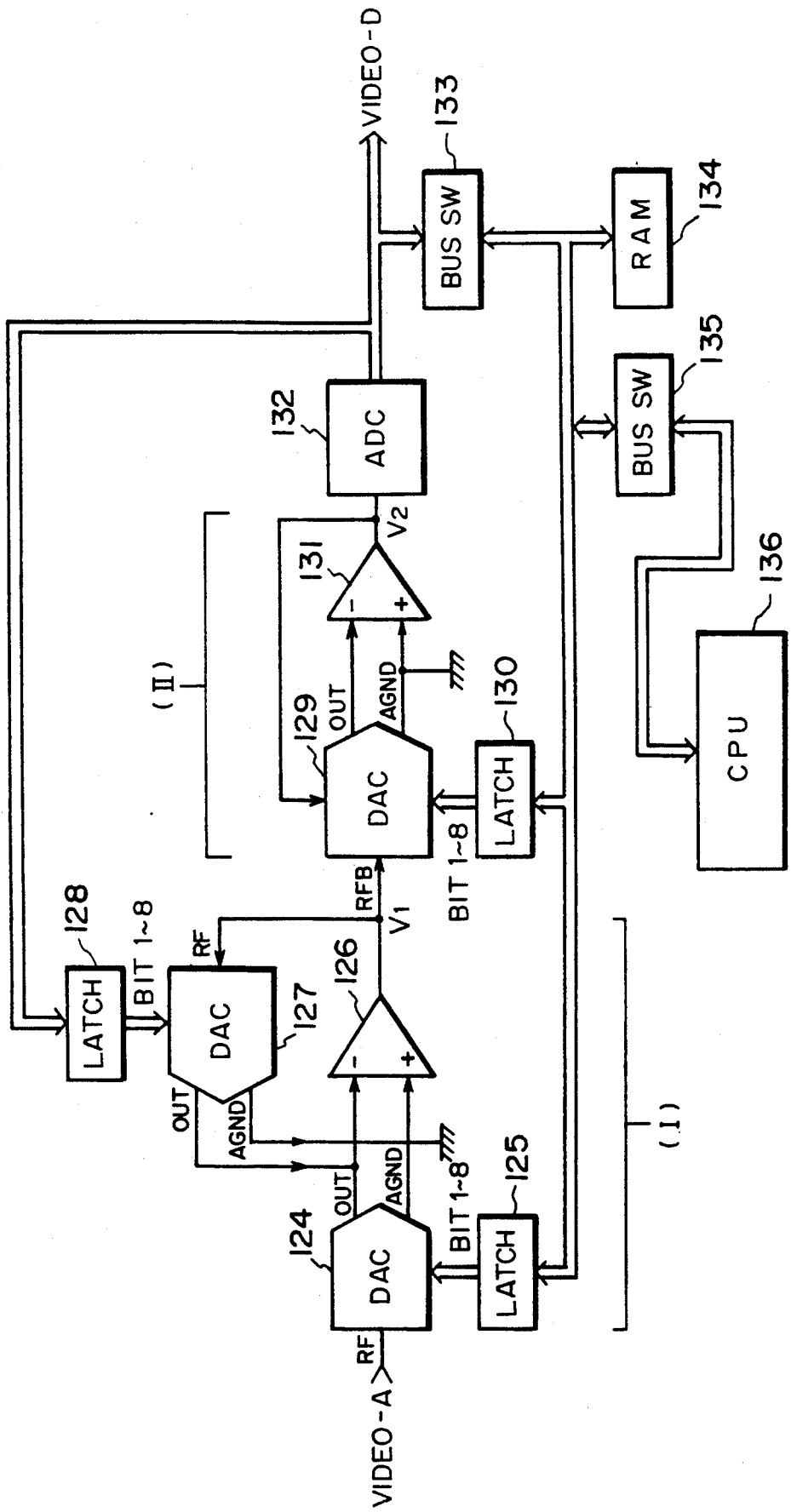
Figure 13:
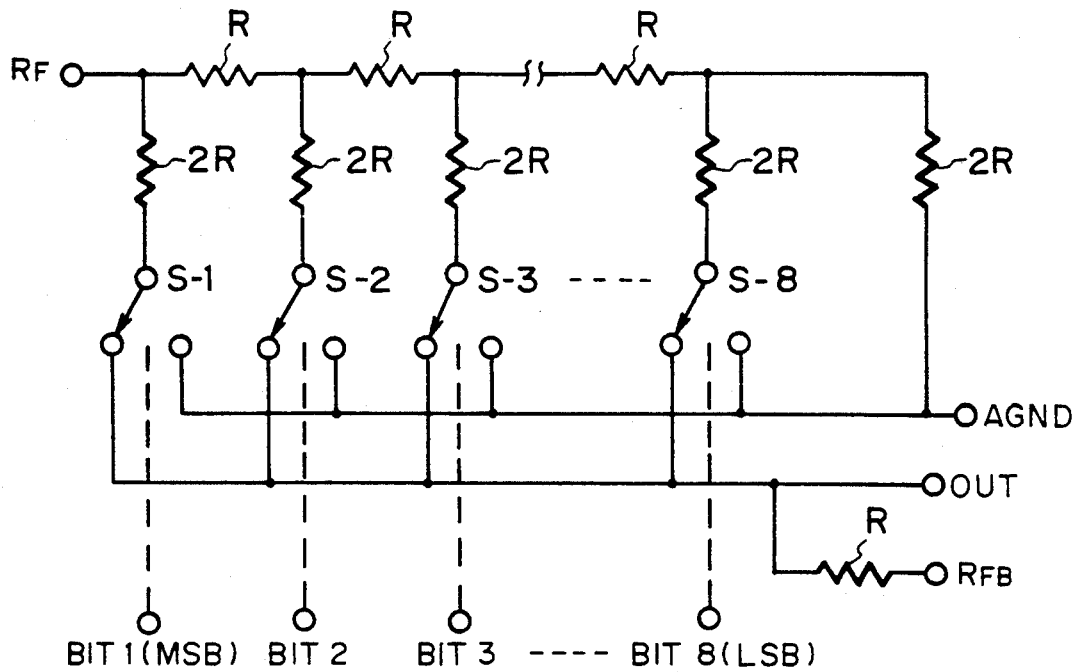
FIG. 13 is a circuit diagram of an A/D converter.

FIG. 12 shows the circuit structure of still another embodiment of the present invention. In FIG. 12 there are provided multiplication D/A converter (hereinafter called DAC) 124, 127, 129 of which resistance is variable according to the digital input data, with a detailed circuit structure as shown in FIG. 13; latch circuits 125, 128, 130 for storing the above-mentioned digital input data to be given to the DAC 124, 127, 129; amplifiers 126, 131 for current-voltage conversion; an A/D converter (hereinafter called ADC) 132 for converting an analog signal into a digital signal; a RAM 134 for storing shading correction data; but switches 133, 135 for controlling the signal flow; and a central processing unit (CPU) 136 composed, for example of a known one-chip microcomputer incorporating, for example, a ROM for storing control programs and control data for said CPU.

An image signal Video-A released from the line sensor 7 (cf. FIG. 1) such as a CCD is subjected to amplification and shading correction in a serial circuit of a DAC 124, an amplifier 126, a DAC 129 and an amplifier 131, and is then converted by an ADC 132 into a digital image signal Video-D. The output of the ADC 132 at a point S to be explained later is supplied through a latch circuit 128 to the DAC 127, thereby regulating the resistance thereof. The input terminal of said DAC 127 is connected to the output terminal of the amplifier 126, while the output terminal of the DAC 127 is connected to the input terminal of said amplifier 126, whereby a feedback circuit is formed.

In the above-explained structure, the output voltage V1 of the amplifier 126, and voltage V2 of the amplifier 131 are given by the following equations (1), (2) when the DAC's 124, 129 are 8-bit D/A converters:

$$V1 = -(NA/NB)*(Video-A) \quad (1)$$

$$V2 = -(256/NC)*V1 \quad (2)$$

wherein NA, NB, NC are digital input data supplied respectively from latch circuits 125, 128, 130 to the DAC's 124, 127, 129, assuming values within a range:

$$1 \leq NA, NB, NC \leq 255.$$

(Video-A) indicates the voltage of the image signal Video-A supplied to the RF input terminal of the DAC 124, and "*" indicates the multiplication.

Figure 4:
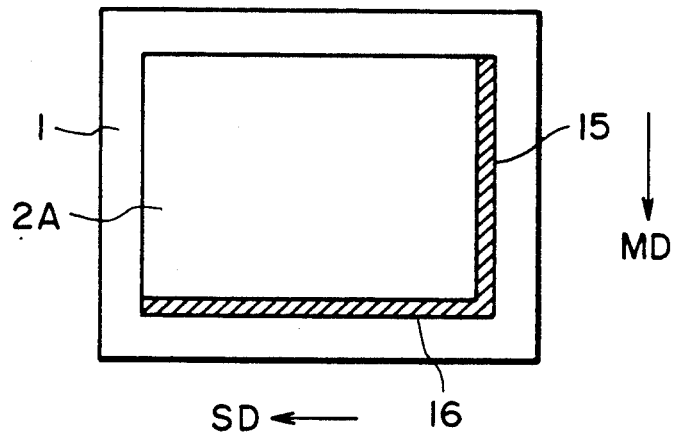
FIG. 4 is a plan view of an example of arrangement of reference plates for reading reference signals.
Figure 14:
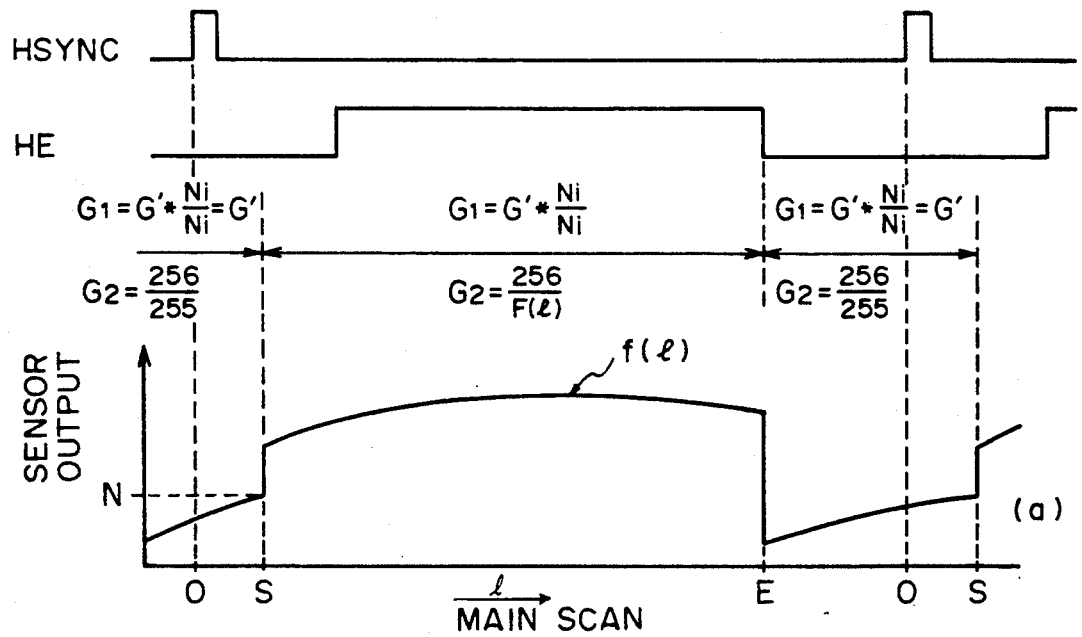
FIG. 14 is a wave form chart showing an example of signals obtained by reading white reference plates.

FIG. 14 shows an example of the signals obtained from the reference plates 15, 16 shown in FIG. 4, wherein HSYNC indicates the synchronization signal of a line, and HE is a signal indicating the effective section of the original image. In the waveform (a), the point S indicates the signal sampling position from the reference plate 16, and f(l) indicates an example of the waveform of the white reference signal.

In the following, the present embodiment will be explained in detail, with reference to FIGS. 12 and 14.

Prior to the storage of the shading correction data in the RAM 134, the CPU 136 determines the gain 6' of the amplifier 126 by setting NC=255 in the equation (1) and NB=1 in the equation (2), and effecting the step-wise increments of the value of NA in (1) (digital input data to the latch 125) from 1 until the digital image signal Video-D of the ADC 132 at the point S in FIG. 14 becomes equal to a predetermined value.

Then the CPU 136 stores, in the RAM 134, the value NA (digital input data) of the latch circuit 125 corresponding to the gain when said predetermined value is reached, as the gain G', and also stores, in the RAM 134, the output digital value Ni of the ADC 132 at the point S in this state.

Then the CPU 136 sets G'*Ni in the latch circuit 125 and Ni in the latch circuit 128, thereby defining the gain $G_1$ of the amplifier 126 according to the equation (3):

$$G_1 = (G'*Ni)/Ni = G' \quad (3)$$

Thereafter, the CPU 136 reads the white reference plate 15 (cf. FIG. 4) and stores the shading correction data of a line in the RAM 134. More specifically, a digital value F(l) obtained by A/D conversion in the ADC 132 of the white reference signal f(l) shown in FIG. 14, is stored for each pixel in the RAM 134.

Subsequently, the CPU 136 reads the original image 3 (cf. FIG. 1) in the following manner.

The CPU 136 sends commands to an unrepresented timing circuit in such a manner that the gain $G_2$ of the amplifier 131 becomes:

$$G_2 = 256/255$$

in an area from E to S outside the effective width of the original image, or $$G_2 = 256/F(l)$$

within an area from S to E within the width of the original image, wherein F(l) is a digital value obtained by A/D conversion of f(l), and that the gain $G_1$ of the amplifier 126 becomes:

$$G_1 = (G'*Ni)/Ni = G'$$

in the area from E to S, or $$G_1 = (G'*Ni)/N$$

in the area from S to E in which the digital output N of the ADC 132 is latched in the latch circuit 128 at the point S.

In case the range of level variation of the input signal Video-A resulting from temperature fluctuation of the fluorescent lamp is within 8 times, and the DAC's 124, 127, 129 are composed of 8-bit D/A converters, the gain reference plate 16 shown in FIG. 4 for obtaining the second reference signal is so selected that the digital output N of the ADC 132 satisfies a relation $N \leq 31$ at the point S in FIG. 14, and the ADC 132 is equipped with an output control terminal.

In the foregoing description, for the ease of understanding, the circuit is functionally divided into a gain correction block (circuit I in FIG. 12) and a shading correction block (circuit II in FIG. 12).

However, if the ratio of the maximum value to the minimum value of the shading error is within 2, a 7-bit digital value may be used for the DAC 127. Thus, it is possible to supply said 7 bits to the lower 7 bits of the DAC 127 and to effect the gain control by the remaining uppermost bit. It is therefore possible to respond to a level variation of the input signal Video-A up to 16 times, by setting a gain of 8 times in the gain correction block I, and setting a gain of 2 times by the uppermost block in the shading correction block II.

Figure 15:
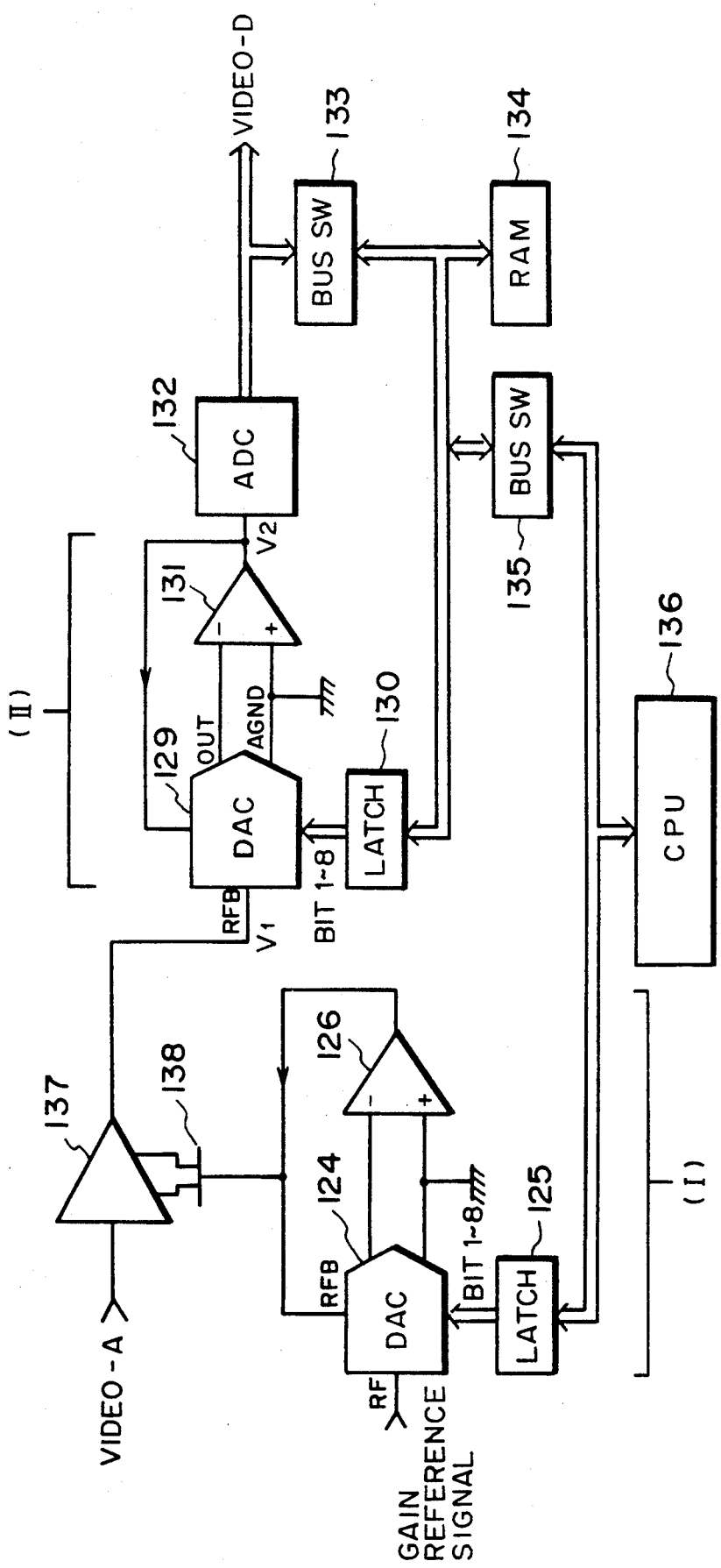

FIG. 15 shows the circuit structure of still another embodiment of the present invention, wherein provided are a video amplifier 137 with a gain control terminal, for amplifying the input image signal Video-A; and an N-channel junction field effect transistor (J-FET) 138 connected to the gain control terminal of the video amplifier 137. When a negative voltage is supplied from the amplifier 126 to the gate of said J-FET 138, the channel resistance varies to control the gain of the video amplifier 137. The gain reference signal from the reference plate 16 is supplied to the RF terminal of the DAC 124 to regulate the gain of the video amplifier 137, following the time-dependent change in the brightness of the light source such as a fluorescent lamp. The output signal of the video amplifier 137 is supplied to the RF terminal of the DAC 129 in the shading correction block II.

The initial gain is determined by a value set by the CPU 136 in the latch circuit 125. The remaining structure is the same as that shown in FIG. 12, and will not, therefore, be explained further.

The above-explained structures enable conversion of the analog signal into a digital signal at an almost full-range state of the A/D converter, and prevent the deterioration in the precision of said conversion by the control of the reference voltage of said A/D converter, thereby improving the precision of the A/D conversion.

Also, said structures enable proper response to the variation in brightness of the light source dependent on temperature and time, thereby improving the quality of the output image signal.

The present invention has been explained by preferred embodiments thereof, but the present invention is not limited to such embodiments and is subject to variations and modifications within the scope and spirit of the appended claims.

What is claimed is:

1. An image reading apparatus comprising:
a light source for illuminating an original image;
reading means for photoelectrically reading the original image illuminated by said light source and generating an analog image signal;
a D/A converter having a digital input terminal, an analog output terminal, and a reference terminal, the analog image signal generated from said reading means being applied to the reference terminal, said D/A converter attenuating a level of the analog image signal applied to the reference terminal based on a damping factor corresponding to digital data applied to the digital input terminal, the attenuated analog image signal being output from the analog output terminal;
amplifying means for amplifying the attenuated analog image signal outputted from the analog output terminal of said D/A converter;
an A/D converter for converting the amplified analog image signal outputted from said amplifying means into a digital image signal; and
control means for controlling the digital data applied to the digital input terminal of said D/A converter to cause the analog image signal supplied to said A/D converter to have a predetermined level.

2. An apparatus according to claim 1, wherein said control means controls the digital data to cause the analog image signal supplied to said A/D converter to have the predetermined level when said reading means reads a reference member illuminated by said light source.

3. An apparatus according to claim 1, wherein said control means varies the digital data in accordance with a variation in an amount of light from said light source.

4. An apparatus according to claim 1, wherein said D/A converter attenuates the analog image signal to a maximum amplitude of (1/n) of the analog image signal level, and wherein said amplifying means amplifies the attenuated analog image signal to an amplitude of n times the analog image signal level, where n is an integer.

5. An apparatus according to claim 1, wherein said light source comprises a rod fluorescent lamp, and wherein said reading means comprises a line sensor.

6. An image reading apparatus comprising:
a light source for illuminating an original image;
reading means for photoelectrically reading the original image illuminated by said light source and generating an analog image signal;
detector means for detecting an amount of light from said light source;
a D/A converter having a digital input terminal, an analog output terminal, and a reference terminal, the analog image signal generated from said reading means being applied to the reference terminal, said D/A converter attenuating a level of the analog image signal applied to the reference terminal based on a damping factor corresponding to digital data applied to the digital input terminal, the attenuated analog image signal being output from the analog output terminal;
amplifying means for amplifying the attenuated analog image signal outputted from the analog output terminal of said D/A converter;
control means for controlling the digital data applied to the digital input terminal of said D/A converter, based on the detection output of said detector means.

7. An apparatus according to claim 6, wherein said detector means detects an amount of light emitted from said light source by reading a reference member illuminated by said light source prior to reading the original image.

8. An apparatus according to claim 6, wherein said control means varies the digital data in accordance with a variation in an amount of light from said light source.

9. An apparatus according to claim 6, further comprising an A/D converter for converting the amplified analog image signal outputted from said amplifying means into a digital image signal.

10. An apparatus according to claim 6, wherein said D/A converter attenuates the analog image signal to a maximum amplitude of (1/N) of the analog image signal level, and wherein said amplifying means amplifies the attenuated analog image signal to an amplitude of n times the analog image signal level, where n is an integer.

11. An image reading apparatus comprising:
a light source for illuminating an original image;
reading means for photoelectrically reading the original image illuminated by said light source and generating an analog image signal;
a reference member which is illuminated by said light source and from which reflected light is read by said reading means;
a D/A converter having a digital input terminal, an analog output terminal, and a reference terminal, the analog image signal generated from said reading means being applied to the reference terminal, said D/A converter attenuating a level of the analog image signal applied to the reference terminal based on a damping factor corresponding to digital data applied to the digital input terminal, the attenuated analog image signal being output from the analog output terminal;
amplifying means for amplifying the attenuated analog image signal outputted from the analog output terminal of said D/A converter;
control means for controlling the digital data applied to the digital input terminal of said D/A converter, based on the output of said reading means when reading said reference member.

12. An apparatus according to claim 11, wherein said control means controls the digital data to cause the output of said amplifying means to have the predetermined level when the reference member is read by said reading means.

13. An apparatus according to claim 11, wherein said D/A converter attenuates the analog image signal to a maximum amplitude of (1/n) of the analog image signal level, and wherein said amplifying means amplifies the attenuated analog image signal to an amplitude of n times the analog image signal level, where n is an integer.

14. An apparatus according to claim 11, further comprising an A/D converter for converting the amplified analog image signal outputted from said amplifying means into a digital image signal.

15. An image reading apparatus comprising:
a light source for illuminating an original image;
reading means for photoelectrically reading the original image illuminated by said light source and generating an analog image signal;
a D/A converter having a digital input terminal, an analog output terminal, and a reference terminal, the analog image signal generated from said reading means being applied to the reference terminal, said D/A converter attenuating a level of the analog image signal applied to the reference terminal based on a damping factor corresponding to digital data applied to the digital input terminal, the attenuated analog image signal being output from the analog output terminal;
amplifying means for amplifying the attenuated analog image signal outputted from the analog output terminal of said D/A converter;
control means for controlling the digital data applied to the digital input terminal of said D/A converter to remove deviation of the analog image signal caused by shading distortion.

16. An apparatus according to claim 15, wherein said D/A converter attenuates the analog image signal to a maximum amplitude of (1/n) of the analog image signal level, and wherein said amplifying means amplifies the attenuated analog image signal to an amplitude of n times the analog image signal level, where n is an integer.

17. An apparatus according to claim 15, further comprising an A/D converter for converting the amplified analog image signal outputted from said amplifying means into a digital image signal.

18. An apparatus according to claim 15, wherein said control means controls the digital data based on shading data representing the shading distortion.

* * * * *

UNITED STATES PATENT AND TRADEMARK OFFICE
CERTIFICATE OF CORRECTION

PATENT NO. : 5,151,796

DATED : September 29, 1992

INVENTOR(S) : ITO ET AL.

It is certified that error appears in the above-identified patent and that said Letters Patent is hereby corrected as shown below:

SHEET 1

Figure 2:
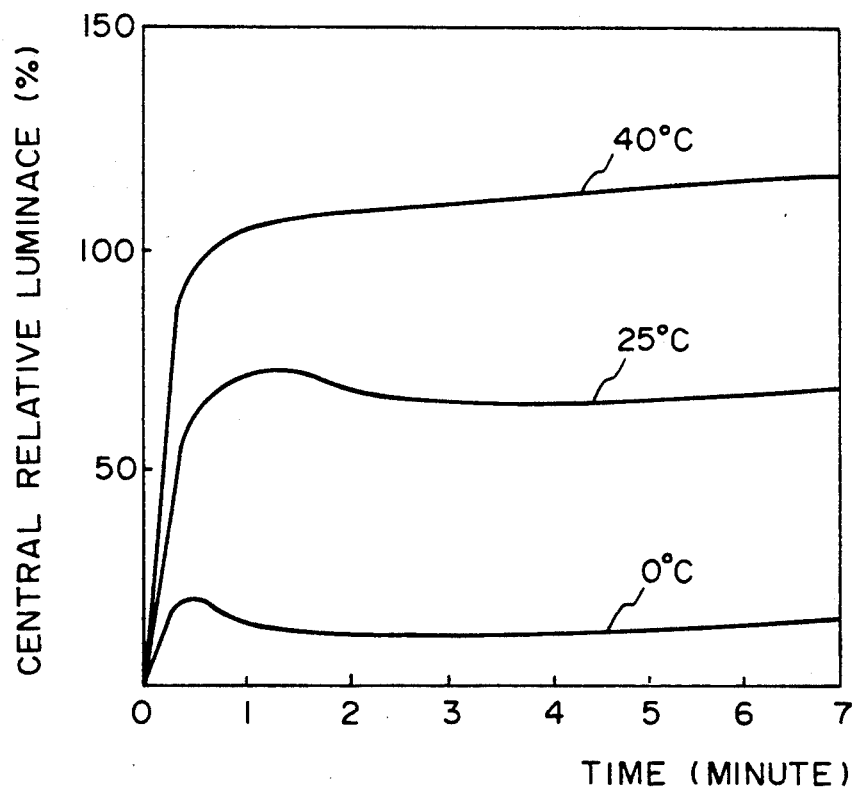
FIG. 2 is a chart showing an example of change in the light intensity of a fluorescent lamp.
Figure 3:
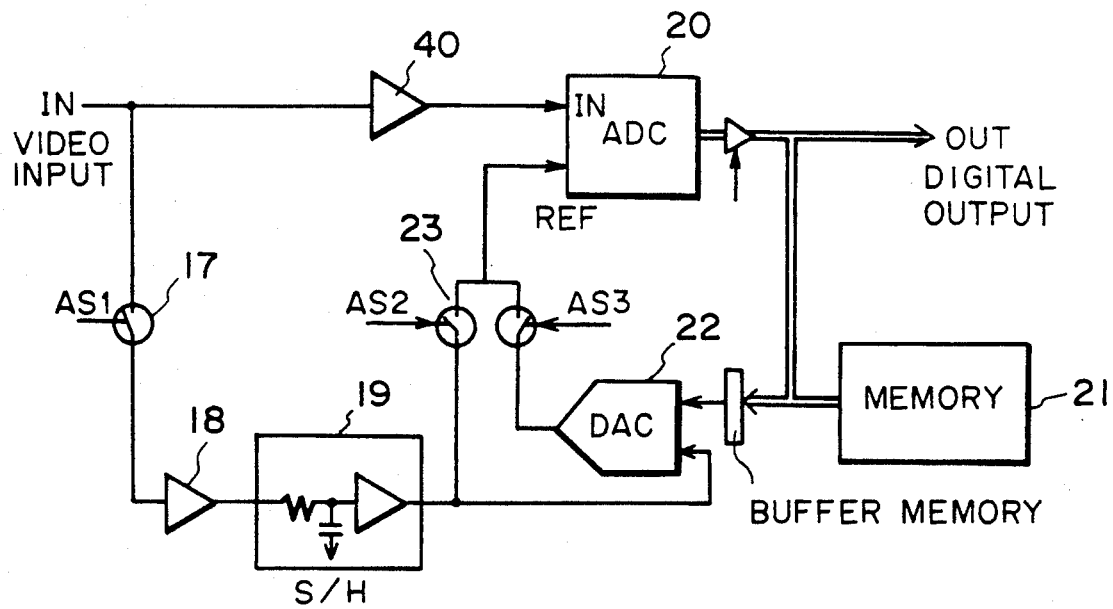
FIG. 3 is a block diagram of a conventional circuit structure.

Figure 2, "LUMINACE" should read --LUMINANCE--.

COLUMN 1

Line 22, "entre" should read --entire--.

COLUMN 3

Line 5, "wave form" should read --waveform--;
Line 19, "wave form" should read --waveform--;
Line 54, "lapeh 28." should read --latch 28.--.

COLUMN 6

Line 28, "wave" should read --wave- --.

COLUMN 7

Line 24, "V1=-(NA/NB)˙(Video-A) (1)" should read --V1=-(NA/NB)˙(Video-A)...(1)--;
Line 26, "V2=-(256/NC)˙V1" should read --V2=-(256/NC)˙V1...(2)--;
Line 65, "$G_1=(G'*Ni)/Ni=G'$ (3)" should read --$G_1=(G'*Ni)/Ni=G'$...(3)--.

UNITED STATES PATENT AND TRADEMARK OFFICE
CERTIFICATE OF CORRECTION

PATENT NO. : 5,151,796

DATED : September 29, 1992

INVENTOR(S) : ITO ET AL.

It is certified that error appears in the above-identified patent and that said Letters Patent is hereby corrected as shown below:

COLUMN 10

Line 39, "(1/N" should read --(1/n)--.

COLUMN 12

Line 3, "from" should read --to--.

Signed and Sealed this

Ninth Day of November, 1993

Attest:

Attesting Officer

BRUCE LEHMAN

Commissioner of Patents and Trademarks